United States Patent [19]

Baker

[11] Patent Number: 5,634,971

[45] Date of Patent: Jun. 3, 1997

[54] PROCESS FOR DISPERSING PIGMENTS WITH POLYOXYALKYLATED ETHERS

[75] Inventor: Timothy J. Baker, Claremore, Okla.

[73] Assignee: Petrolite Corporation, St. Louis, Mo.

[21] Appl. No.: 548,200

[22] Filed: Oct. 25, 1995

[51] Int. Cl.$^6$ ............................ C08K 5/10; C09B 67/50; B01J 13/00

[52] U.S. Cl. .................. 106/499; 106/412; 106/437; 106/460; 106/493; 106/31.76; 106/31.77; 106/31.78; 106/31.8; 106/31.79; 106/31.86; 241/16; 252/313.1; 252/314; 252/363.5; 526/932

[58] Field of Search ...................... 252/313.1, 314, 252/363.5; 106/23 C, 412, 499; 241/16; 526/932

[56] References Cited

U.S. PATENT DOCUMENTS

| | | | |
|---|---|---|---|
| Re. 34,329 | 8/1993 | Baker et al. | 106/271 |
| 3,104,068 | 9/1963 | Castelli et al. | 241/16 |
| 3,542,575 | 11/1970 | Nelson | 241/16 X |
| 3,590,076 | 6/1971 | Heinzelman et al. | 560/198 |
| 3,657,175 | 4/1972 | Zimmerman | 526/932 X |
| 3,775,149 | 11/1973 | Langley et al. | 106/412 |
| 3,950,290 | 4/1976 | Drury, Jr. et al. | 524/276 |
| 4,127,422 | 11/1978 | Guzi, Jr. et al. | 106/412 X |
| 4,158,572 | 6/1979 | Blackburn et al. | 106/412 |
| 4,499,225 | 2/1985 | Kubo et al. | 524/276 |
| 4,686,260 | 8/1987 | Lindemann et al. | 524/458 |
| 4,908,063 | 3/1990 | Baker et al. | 106/31 |
| 4,929,279 | 5/1990 | Hays | 106/412 |
| 5,376,170 | 12/1994 | Baker | 106/271 |

FOREIGN PATENT DOCUMENTS

| | | |
|---|---|---|
| 0542033 A2 | 10/1992 | European Pat. Off. |
| 380431 | 4/1931 | United Kingdom. |
| 950844 | 7/1960 | United Kingdom. |
| WO 94/18137 | 8/1994 | WIPO. |

Primary Examiner—Richard D. Lovering
Attorney, Agent, or Firm—Liddell, Sapp, Zivley, Hill & LaBoon, L.L.P.

[57] ABSTRACT

A process of dispersing a pigment consists of agitating a pigment in water with a polyoxyalkylated ether dispersant. The polyoxyalkylated ether comprises Units of the formulae A and B wherein Unit A is an alkyl group of the formula:

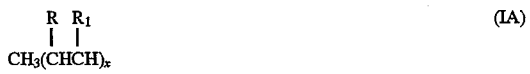

and;

Unit B is an oxyalkylate of the formula:

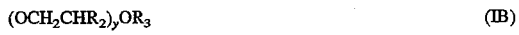

wherein R and $R_1$ individually represent hydrogen or a $C_1$–$C_{10}$ alkyl group; $R_2$ is —H or a $C_1$–$C_5$ alkyl group; x represents a number from about 9 to about 75; $R_3$ is —H or a $C_1$–$C_5$ alkyl group; and y is between about 1 to about 475.

29 Claims, No Drawings

PROCESS FOR DISPERSING PIGMENTS WITH POLYOXYALKYLATED ETHERS

FIELD OF THE INVENTION

The present invention pertains to a process of preparing an aqueous dispersion containing a pigment uniformly distributed throughout. In particular, the invention relates to a process of dispersing a pigment in an aqueous system with a polyoxyalkylated ether.

BACKGROUND OF THE INVENTION

The printing industry has long recognized that use of water instead of volatile organic solvents, as the volatile component in inks, offers many advantages. In particular, water-based inks are free of the environmental problems commonly associated with solvent-based inks. Further, they exhibit less odor, are less toxic, and are more economical than solvent-based inks. The latter is particularly true when the costs of equipment clean-up of water-based versus solvent-based inks is compared.

Commercial water-based inks typically are composed of water, water miscible organic solvents, natural resins (such as rosin, shellac, dammar or tannin), pigments and a dispersing agent. Water-based inks have been prepared by dispersing the pigment in a vehicle of an acrylic copolymer, acidic rosin ester, shellac or acidic styrene copolymers. (The function of the vehicle is to act as a carrier for the pigment and as a binder to affix the pigment to the printed surface.) See, for instance, U.S. Pat. Nos. 4,908,063 and 5,376,170, herein incorporated by reference.

The performance of water-based inks is dependent on the dispersibility of the pigment in the system. Dispersibility is a measure of the ease with which particulates of pigment can be uniformly and intimately mixed in the system. Poor dispersion of the pigment particulates causes the formation of large agglomerates of pigment particles which, in turn, result in surface imperfections, color streaks, non-uniform coloration and incomplete color development of the resultant ink composition.

Attempts have been made to provide pigment particles with enhanced dispersion and coloring properties for water-based systems. See, for instance, U.S. Pat. No. 4,929,279 which discloses a process of dispersing an organic pigment by the formation of a presscake from a solid surfactant and an aqueous slurry of pigment. Suitable surfactants include a $C_{18}$ poly(ethylene oxide) ether having 9 units of ethylene oxide. Such surfactants are further characterized as having a HLB of approximately 12.4. The pigment was dispersed by subjecting the admixture to ultrasonic radiation. Unfortunately, the incompatibility between the pigment and the surfactant caused severe problems. One of these problems was the flocculation of the pigment particulate. The strength of the pigment dispersion was therefore compromised. In addition, the resulting product demonstrates severe foaming problems.

Improved methods for dispersing pigments, which exhibit decreased flocculation, decreased foaming and improved retention of pigment strength in aqueous based systems, especially at low concentrations, is therefore desired.

SUMMARY OF THE INVENTION

The present invention is drawn to a process of dispersing a pigment wherein agglomeration of the pigment, in the resulting dispersion, is markedly decreased if not eliminated. In particular, the invention relates to a method of dispersing a pigment into an aqueous based system.

In accordance with the invention, the pigmented dispersion is obtained by agitating a mixture of water, pigment and polyoxyalkylated ether. The dispersion, to which the agitation means is applied, may be prepared by different methods. For instance, a dry powder admixture of pigment (or pigment concentrate) and polyoxyalkylated ether may be dispersed in water. Alternatively, polyoxyalkylated ether may be dispersed in water prior to the introduction of the pigment (or pigment concentrate). Alternatively, the pigment (or pigment concentrate) may be dispersed in water prior to its addition of the polyoxyalkylated ether.

The dispersant used in the process of this invention is a polyoxyalkylated ether having the Units A and B wherein Unit A is an alkyl group of the formula:

(IA)

wherein R and $R_1$ individually represent hydrogen or a $C_1$–$C_{10}$ alkyl group; and x represents a number from about 9 to about 75; and Unit B is an oxyalkylate of the formula:

(IB)

wherein $R_2$ is —H or a $C_1$–$C_5$ alkyl group; $R_3$ is —H or a $C_1$–$C_5$ alkyl group and y is between about 1 to about 475.

The process of this invention renders a pigment dispersion with fewer agglomerates than the dispersions produced by the methods of the prior art. Further, the dispersions produced by the process of the invention exhibit low, if any, foam. Still further, improved gloss is achieved when the pigment dispersions of this invention are used to make an ink composition. Such improvements in gloss are attributable to the ability of the pigment dispersions to form fewer agglomerates than previously seen with the prior art dispersions.

Particularly preferred as dispersants in the process of the invention are those polyoxyalkylated ethers represented by the formulae:

(1)

(I)

A and B representing Units A and B, respectively, as defined above, wherein $R_3$ of Unit B is -H and further wherein the B/A+B weight ratio is between about 75 to about 95. Such dispersants are typically characterized as having a hydrophile-lipophile balance (HLB) which is greater than or equal to 15.0;

(2)

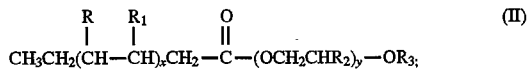
(II)

wherein R, $R_1$, $R_2$, x and y have the meanings set forth above and $R_3$ is a $C_1$–$C_5$ alkyl group; and (3) the reaction product of (i) a polymer derived from a polyolefin and an ethylenically unsaturated carboxylic acid, ester or anhydride thereof and (ii) an alkyl end-capped polyalkylene glycol of the formula

(III)

wherein $R_2$ and y have the meanings set forth above and $R_3$ is a $C_1$–$C_5$ alkyl group.

DETAILED DESCRIPTION OF THE INVENTION

As used throughout the specification, unless otherwise noted, the term "molecular weight" refers to number average molecular weight.

In accordance with the invention, a pigment dispersion may be obtained by agitating a composition comprising water, a pigment and a polyoxyalkylated ether dispersant. In one embodiment of the invention, water, pigment and dispersant are simultaneously added to the reaction vessel.

The pigment used in the composition may exist either in a solid state or as a pigment concentrate. The latter consists of a grinding resin, a high concentration of pigment, and surfactant. The grinding resin acts as a binder and assists in reducing the particle size of the pigment. Thus, the grinding resin, normally composed of flaky materials, serves to control the viscosity of the concentrate. Preferred grinding resins are copolymers of a vinyl aromatic monomer, such as styrene, and an ethylenically unsaturated carboxylic acid, ester or an anhydride. Included in the latter are maleic acid, fumaric acid, itaconic acid and malonic acid as well as their esters and anhydrides. Particularly preferred are styrene-maleic acid anhydride copolymers. Further preferred for use as grinding resins are the acrylic resins, such as JONACRYL® 77 resin. Suitable acrylic resins includes styrenated acrylic polymers as well as copolymers of acrylic monomers and vinyl monomers such as acrylonitrile, butadiene, vinyl chloride and vinyl acetate. The acrylic monomers are typically acrylic esters such as methyl acrylate, ethyl acrylate, isopropyl acrylate, butyl acrylate, methyl methacrylate, etc. The monomers can also be the free acid. Suitable copolymers may further include copolymers of two or more acrylic monomers.

Since dispersing pigments in grinding resins is time-consuming and requires specialized equipment, most commercial pigment suppliers offer such pigment concentrates for sale. Naturally, the concentration of pigment in such pigment concentrates is greater than the desired concentration of pigment in the desired resulting dispersion. Typically, the concentration of pigment in such pigment concentrates is between from about 20 to about 80 weight percent and the amount of surfactant is typically between about 0.5 to about 5 weight percent.

Where a solid pigment is employed, in place of pigment concentrate, it is preferable to add a grinding resin, such as those referenced above, to the solid pigment.

The invention described herein may further be practiced in the manufacture of such pigment concentrates. In place of the surfactants presently employed in pigment concentrates, pigment concentrates may be directly prepared with the polyoxyalkylated ethers described herein having the Units A and B. In such instances, a slightly higher amount of surfactant than that recited in the paragraph above would be used.

Dispersions prepared by the process of the invention render formulated compositions with improved gloss over ink compositions formulated with dispersions prepared by the processes of the prior art. In addition, the dispersions of the invention exhibit improved color development. The dispersions further are of economic importance since they require a lower concentration of pigment then the prior art compositions to impart similar effects.

The pigment and dispersant, in the process of this invention, are agitated in either a shot mill or ball mill. In this step, the dispersant is treated to the extent necessary in order to get it into solution. Normally between about 1 to about 30 wt. percent of the dispersant is dispersible in water. In the shot mill, the admixture is ground with high energy until the pigment is uniformly distributed. Typically, the amount of grinding ranges for a period ranging of from about 1 to about 24 hours. Alternatively, the dispersion may be ground in a ball mill which necessitates a longer grinding time; typically between about 1 to about 48 hours. The resulting product contains a more uniform distribution of pigment particles. Optimum performance properties of the pigment particles are therefore obtained.

The resulting dispersion typically contains between about 25 to about 90 weight percent water (preferably between about 55 to about 80 weight percent), about 10 to about 75 weight percent pigment (preferably between about 20 to about 35 weight percent), about 3 to about 15 weight percent (preferably between about 6 to about 12 weight percent) of grinding resin, and about 0.1 to about 20 weight percent polyoxyalkylated ether (preferably between about 0.5 to about 10 weight percent).

The process of this invention further may be used to disperse the pigment in an aqueous medium which is essentially wax-free.

In a preferred embodiment of the invention, the polyoxyalkylated ether is dispersed in water prior to admixing the ether with the pigment. The aqueous dispersion of polyoxyalkylated ether may be prepared by first melting the polyoxyalkylated ether and then pouring the molten polyoxyalkylated ether into hot water. The weight ratio of polyoxyalkylated ether:hot water is between 1:6 and 1:9. The water solution is then cooled. The resulting solution is then added to the pigment dispersion. The polyoxyalkylated dispersion is added to the pigment dispersion such as to render a final dispersion containing between about 10 to about 75 weight percent of pigment. A dispersion having pigment uniformly distributed throughout is then obtained by use of either ball mill or shot mill in the manner described in the paragraphs above.

The dispersion of this invention may further be produced by diluting the pigment concentrate with water-or where solid pigment is used, combining the solid pigment with water-prior to milling or mixing the pigment with polyoxyalkylated dispersant. The resulting mixture has lower viscosities than those evidenced in the prior art. This allows for higher pigment loadings.

Still further, solid polyoxyalkylated ether may be admixed with dry pigment. The weight ratio of polyoxyalkylated ether:pigment is generally between about 1:10 to about 1:75. Water is then added to the dry blend and then agitated by use of shot or ball mill in the manner set forth above.

Alternatively, the procedure set forth in the above paragraph may be modified by use of a pigment concentrate instead of dry segment. The amount of solid polyoxyalkylated ether added to pigment concentrate is generally between about 0.5 to about 1 weight percent. The composite is then agitated by use of either ball or shot mill in the manner and for the duration specified above.

The pigment for use in the invention may be any of the organic or inorganic pigments conventionally used in the art. Typically, such pigments include at least one member selected from the group consisting of nitroso, monoazo, diazo, (especially diazopyrazolone pigments such as C.I. Pigment Orange 13 and 34 and C.I. Pigment Red 37 and 41), diazocondensation pigments, basic dye pigments, alkali blue pigments, Peacock blue lake pigments, phloxine pigments, quinacridone pigments, lake pigments of Acid Yellow 1 and 3, carbazole dioxazine violet pigments, alizarine lake pigments, vat pigments, phthalocyanine, diaryl pigments, β-naphthol pigments, carbon black pigments, $TiO_2$ and iron oxide. Most preferably, the organic pigment is selected from the group consisting of acetoacetanilde (AAA) diarylide yellow (Pigment Yellow 12), phthalocyanine pigments such as copper phthalocyanine (C.I. Pigment Blue 15), carbon black (Pigment 7), $TiO_2$ and iron oxide.

Dispersants for use in the process of this invention are those polyoxyalklated ethers having the Units A and B wherein Unit A is an alkyl group of the formula:

(IA)

wherein R and $R_1$ individually represent hydrogen or a $C_1$–$C_{10}$ alkyl group, preferably a $C_1$–$C_5$ alkyl group, most preferably —H or —$CH_3$, and x generically represents a number from about 9 to about 75.

Unit B is an oxyalkylate of the formula:

$$(OCH_2CHR_2)_yOR_3 \quad (IB)$$

wherein $R_2$ may be represented as —H or a $C_1$–$C_5$ alkyl group, most preferably —H or —$CH_3$; $R_3$ may be represented as —H or a $C_1$–$C_5$ alkyl group, preferably —H or —$CH_3$; and y is between about 1 to about 475.

The number average molecular weight of the polyoxyalkylated ethers may range generically from about 350 to about 82,000, preferably from about 900 to about 8,000, most preferably no greater than 6,000. Unit A of the formula above typically has a number average molecular weight between about 250 to about 5,000, preferably 350 to about 2,000, more preferably 425 to about 1,000.

The method of the invention offers several advantages over the methods of the prior art. First, the process requires relatively small amounts of dispersants. Second, attributes of Unit A as well as Unit B of the polyoxyalkylated ether dispersant contribute to the performance qualifies of the resulting dispersion. While not wishing to be bound by any particular theory, it is believed that the polyoxyalkylated ethers display an affinity towards the pigment. The polyoxyalkylated ether typically is characterized by a loop "S" shape. The oxyalkylate group, Unit B, assists in dispersing the molecule in water. The oxyalkylate group is therefore kept away from the alkyl portion of the molecule, Unit A. As a result, the pigment is easily dispersed in the aqueous system; thereby preventing the formation of agglomerates. The relative efficiency of the hydrophilic and lipophilic portions of the molecule can be controlled by the addition of varying amounts of alkylene oxide, such as ethylene oxide.

The dispersions resulting from the process of the invention when formulated into their final composition (such as an ink) further exhibit excellent color quality, high uniformity of pigment particle and little agglomeration, high gloss, good transparency and little foaming.

Particularly preferred as dispersants for use in the process of the invention are those polyoxyalkylated ethers represented by the formula

(I)

A and B representing Unit A (IA) and Unit B (IB), respectively, as defined above; or

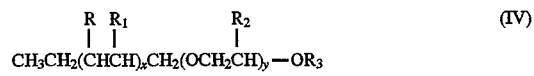
(IV)

wherein the B/A+B weight ratio is between about 75 to about 95, preferably about 80 to 90, most preferably 90. The average molecular weight of the polyoxyalkylated ethers of Formula (IV) is preferably about 350 to about 20,000; most preferably less than 5,000.

Preferred for use as the polyoxyalkylated ethers of those dispersants represented by formula (IV) are:

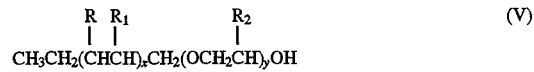
(V)

Especially preferred of those dispersants of formula (V) are those wherein R and $R_1$ are independently selected from the group consisting of —H and a $C_1$–$C_3$ alkyl group; and $R_2$ is —H or a $C_1$–$C_3$ alkyl group.

Most preferred are those compounds wherein R, $R_1$ and $R_2$ are independently hydrogen or a methyl group, especially those represented by the formulae:

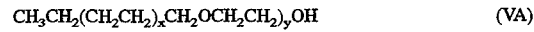
(VA)

and

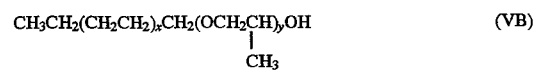
(VB)

as well as mixtures thereof.

The polyoxyalkylated ethers of formula (IV) above may be prepared by several methods. One of these consists of alkoxylating the alcohol represented by the formula:

(VI)

wherein R, $R_1$ and x are as defined above for (IV). A suitable family of primary linear polymeric alcohols to be alkoxylated are commercially available under the trade name UNILIN® alcohols from Petrolite Polymers Division. Long chain linear polymeric alcohols, such as UNILIN® alcohols, are, in turn, derived by hydroxylating long chain hydrocarbons.

The primary linear polymeric alcohols may be reacted with alkoxylating agents such as ethylene oxide, propylene oxide and mixtures thereof. The staring materials can be readily alkoxylated with the just described alkylene oxides using typical base catalysts, such as potassium hydroxide, sodium hydroxide, sodium ethoxide, potassium t-butoxide, sodium hydride or sodium or potassium metals. The reaction is normally conducted under pressures of 0 to 60 psig and at temperatures of 212° to 356° F. (100° to 180° C.). Higher temperatures are normally avoided to minimize side reactions and color formation.

By varying the molecular weight of the staring alcohol and the amount of alkoxylation, a variety of compounds of varying molecular weights can be prepared. Thus, the molecular weight of the staring alcohol may be known to have an average molecular weight of from about 270 to about 2,000.

Especially preferred polyoxyalkylated ethers for use in the invention are UNITHOX® 490, UNITHOX® 580, and UNITHOX® 380 ethoxylates. UNITHOX® 490 is an ethoxylated alcohol which consists of ten weight percent of Unit A of the formula (IA) (wherein R and $R_1$ are hydrogen) and having a molecular weight of about 425 and ninety weight percent of Unit B of the formula (IB) (wherein $R_2$, as well as $R_3$, are hydrogen). UNITHOX® 580 is an ethoxylated alcohol which consists of twenty weight percent of Unit A of the formula (IA) (wherein R and $R_1$ are hydrogen) and having a molecular weight of about 550 and eighty weight percent of Unit B of the formula (IB) (wherein $R_2$, as well as $R_3$, are hydrogen). UNITHOX® 380 is an ethoxylated alcohol which consists of 20 weight percent of Unit A (wherein R and $R_1$ are —H) of molecular weight 350 and 80 weight percent of the ethoxylate units of Unit B (wherein $R_2$, as well as $R_3$, are hydrogen). UNITHOX® 490, UNITHOX® 380 and UNITHOX® 580 are all products of Petrolite Polymers Division in Tulsa, Okla.

Alternatively, the dispersants for use in the invention may be of the formula

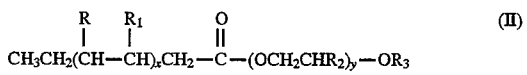

wherein R, $R_1$ and x have the meanings set forth above for substituents of Unit (IA); $R_2$ and y have the meanings set forth above for substituents of Unit (IB); and $R_3$ is a $C_1$–$C_5$ alkyl. Preferred are those dispersants of formula (II) wherein R, $R_1$, and $R_2$ independently are —H or a $C_1$–$C_3$ alkyl group, most preferably —H or —$CH_3$; $R_3$ is a methyl group; and y represents a number of at least 3. In the preferred embodiment, R, $R_1$ and $R_2$ are independently selected from hydrogen and methyl; x is preferably less than about 55, most preferably less than about 15; and y is preferably between about 6 and about 275, most preferably between about 6 and about 180.

The dispersants of formula (II) may be prepared by oxidizing an alcohol, such as that of the formula:

wherein R, $R_1$ and x may be any of the substituents denoted above for Unit A to render the corresponding carboxylic acid. Oxidation reagents and processes for effectuating the production of such carboxylic acids are well known in the art. Alternatively, commercially available high molecular weight solid carboxylic acids of the formula RCOOH wherein R is a straight or linear saturated hydrocarbon chain of molecular weight between about 300 and about 2,000 may be directly used. Such carboxylic acids are sold by Petrolite Polymers Division as UNICID® carboxylic acids.

The carboxylic acid is then preferably esterified by techniques well known in the art with the alkyl end-capped polyalkylene glycol of formula

wherein $R_2$ and y have the meanings as set forth above for substituents for Unit B for formula (II) above; and $R_3$ is a $C_1$–$C_5$ alkyl. In a preferred embodiment $R_2$ is hydrogen or methyl and y is from about 8 to about 475. Particularly preferred are the commercially available methyl end-capped polyethylene glycols ($R_3$ being methyl).

Still further, the dispersant for use in the invention may be a reaction product of (i) a polymer derived from a polyolefin and an ethylenically unsaturated carboxylic acid or an ester or anhydride thereof; and (ii) an alkyl end-capped polyalkylene glycol of formula (VII) above. Suitable polymers of (i) include those set forth in U.S. Pat. No. 3,590,076, herein incorporated by reference. The number average molecular weight of the polymer is generally from about 300 to about 5,000.

The polyolefin is preferably derived from an α-olefin, preferably one containing between about two to about eight carbon atoms. Ethylene and/or propylene are especially preferred.

Suitable ethylenically unsaturated carboxylic acids are those having between about 3 to about 12 carbon atoms, preferably 4 to 5 carbon atoms. Dicarboxylic acids and anhydrides thereof are preferred. These include maleic acid, ethylmaleic acid, propylmaleic acid, isopropyl maleic acid, fumaric acid, methylenemalonic acid, glutaconic acid, itaconic acid, methylitaconic acid, mesaconic acid and citraconic acid and their mixtures, as well as the corresponding esters, anhydrides and mixtures of such acids, esters and anhydrides. Isopropyl maleic acid, esters and anhydrides therefore are especially preferred.

Suitable polymers, for reaction with the compound of formula (VII), are of the structural formula:

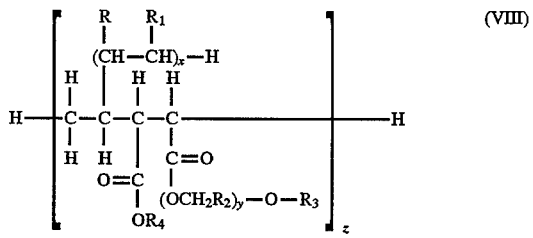

wherein R, $R_1$ and x are as defined above for Unit A; $R_2$ and y are as defined above for unit B; $R_3$ is a $C_1$–$C_5$ alkyl group; $R_4$ is a hydrogen or a —$R_5$ group; $R_5$ is a $C_1$–$C_3$ alkyl group, such as i-propyl; and z is between from about 5 to about 20. In a more preferred embodiment, R and $R_1$ are independently methyl or hydrogen; $R_3$ is —$CH_3$; x is between from about 3 to about 15; y is between from about 8 to about 475; and z is about 5 to about 14.

CERAMER® 1608 is representative of such copolymers. CERAMER® 1608 is a copolymer of a $C_{30}$ α-olefin and isopropyl maleate and is characterized by a molecular weight (gel permeation chromatography) of 700, an acid number (BWM 3.01A) of 160, a saponification number (BWM 3.0 IA) of 212 and a penetration index at 25° C. (ASTM 1321) of 2.0. The molar ratio of α-olefin:isopropyl maleate in the copolymer is about 1:1. Some units of isopropyl maleate and/or maleic acid anhydride may further be grafted onto the copolymer backbone. Increasing the amount of acid (isopropyl maleate) favors formation of graft copolymers.

Further, the reaction product for use as the dispersant in this invention may be that resulting from reaction of an alkyl end-capped polyalkylene glycol, such as that of formula (VII), and a graft polymer. Such graft polymers may be of formula (VIII) above wherein z is 1. The hydrocarbyl portion of such graft copolymers—i.e. the polyolefin—comprises the backbone of the graft copolymer. Suitable grafting monomers include the above-described $C_3$–$C_{12}$ ethylenically unsaturated carboxylic acids, esters and anhydrides. Preferred are maleic acid, fumaric acid, methylenemalonic acid, glutaconic acid, itaconic acid, mesaconic acid and citraconic acid and their anhydrides. Isopropyl maleic acid is most preferred.

The polyolefin used as the backbone in such graft polymers is typically polyethylene, polypropylene, or a copolymer of ethylene and propylene. The molecular weight of the polyolefin backbone is normally between about 400 and about 3000. The functional groups (grafting monomers) of the graft polymers may generally be quantified by determination of an acid number which is the amount of KOH in milligrams required to neutralize one gram of the polymer. Such graft polymers generally have an acid number in the range of about 5 to about 200. The production of such graft polymers is well known in the art. Such graft polymers include CERAMER® 67, a product of Petrolite Polymers Division.

The reaction product of the polymer and alkyl end-capped polyalkylene glycol is prepared by methods recognized in the art.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

EXAMPLES

The following Dispersants were prepared:

Dispersant 1—An ethoxylated alcohol of the formula

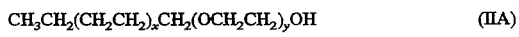

$$CH_3CH_2(CH_2CH_2)_xCH_2(OCH_2CH_2)_yOH \quad (IIA)$$

wherein y is y=87 [B/A+B=90] was prepared by reacting 100 g of UNILIN® 425 alcohol, a product of Petrolite Polymers Division (PPD) of Tulsa, Okla., with 900 g of ethylene oxide in the presence of 1 g of potassium hydroxide under pressures of 35 psig and a temperature of about 130° C. The ethylene oxide was added slowly over about 18 hours to maintain the target pressure.

Dispersant 2—UNITHOX 480, a commercial product of Petrolite Polymers Division of Petrolite Corporation.

Dispersant 3—An ethoxylated alcohol of the formula

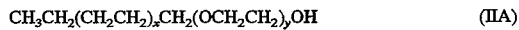

$$CH_3CH_2(CH_2CH_2)_xCH_2(OCH_2CH_2)_yOH \quad (IIA)$$

wherein y is 100 [B/A+B=80] was prepared by reacting 200 g of UNILIN® 550 alcohol, a product of Petrolite Polymers Division, with 800 g of ethylene oxide in the presence of 2 g of potassium hydroxide under pressures of 35 psig and a temperature of about 130° C. The ethylene oxide was added slowly over about eight hours to maintain the target pressure.

Dispersant 4—An ethoxylated alcohol of the formula

$$CH_3CH_2(CH_2CH_2)_xCH_2(OCH_2CH_2)_yOH \quad (IIA)$$

wherein y is 32 [B/A+B=80] was prepared by reacting 200 g of UNILIN® 350 alcohol, a product of Petrolite Polymers Division, with 800 g of ethylene oxide in the presence of 2 g of potassium hydroxide under pressures of 35 psig and a temperature of about 130° C. The ethylene oxide was added slowly over about eight hours to maintain the target pressure.

Dispersant 5—An ethoxylated alcohol of the formula

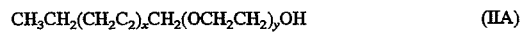

$$CH_3CH_2(CH_2C_2)_xCH_2(OCH_2CH_2)_yOH \quad (IIA)$$

wherein y is 72 was prepared by reacting 100 g of UNILIN® 350 alcohol, a product of Petrolite Polymers Division, with 900 g of ethylene oxide in the presence of 1 g of potassium hydroxide under pressures of 35 psig and a temperature of about 130° C. The ethylene oxide was added slowly over about 18 hours to maintain the target pressure.

Dispersant 6—A product of the formula (IIA) above wherein y is 128 [B/A+B=93] was obtained by reacting 70 g of UNILIN® 425 alcohol with 930 g of ethylene oxide in the presence of 0.7 g of potassium hydroxide under pressures of 35 psig and a temperature of about 130° C. The ethylene oxide was added slowly over about 26 hours to maintain the target pressure.

Dispersant 7—A product of the formula

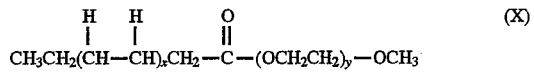

$$CH_3CH_2(CH-CH)_xCH_2-\overset{O}{\underset{\|}{C}}-(OCH_2CH_2)_y-OCH_3 \quad (X)$$

wherein x is 14 and y is 180 was prepared by esterifying 50 g of UNICID® 425 carboxylic acid, a product of Petrolite Polymers Division, with 720 g of methyl end-capped polyethylene glycol of molecular weight 8,000, commercially available as PEG 8000 Methyl Ether. The reaction was conducted at a temperature of about 160° C. at normal pressures for 8 hours.

Dispersant 8—A product of the formula (X) above was prepared by esterifying 50 g of UNICID® 425 carboxylic acid with 410 g of a methyl end-capped polyethylene glycol having molecular weight of about 4,600, commercially available as PEG 4600 Methyl Ether. The reaction was conducted at a temperature of about 160° C. at normal pressures for 8 hours.

Dispersant 9—A dispersant was prepared by esterifying 35 g of CERAMER® 67 graft copolymer, a product of Petrolite Polymers Division, with 180 g of polyethylene glycol methyl ester of molecular weight 2000, a product of the formula

$$H(OCH_2CH_2)_y-O-CH_3 \quad (VIII)$$

wherein y is 45, commercially available as PEG 2000 Methyl Ether. CERAMER® 67 is a graft polymer of Petrolite Polymers Division and has a polyethylene backbone. The grafting monomer is isopropyl maleate (formed by the reaction of isopropanol and maleic acid anhydride). The reaction was conducted at a temperature of about 160° C. at normal pressures for 8 hours. The molecular weight (determined by gel permeation chromatography) of CERAMER® 67 is 655. The graft copolymer is further characterized by an acid number (BWM 3.01A) of 48, a saponification number (BWM 3.02A) of 77 and a penetration index (at 25° C.) ASTM D 1321 of 3.

Dispersant 10—A product obtained by esterifying 35 g of CERAMER® 67 graft copolymer with 720 g of polyethylene glycol methyl ester of formula

$$H(OCH_2CH_2)_y-O-CH_3 \quad (VIII)$$

wherein y is 180, and having a molecular weight 8,000, commercially available as PEG 8000 Methyl Ether. The reaction was conducted at a temperature of about 160° C. at normal pressures for 8 hours.

EXAMPLES 1–12

About 90 g of a phthalo blue pigment concentrate was introduced into a grinding jar. To one of the jars was added 9 g deionized water. To a second jar was 10 g of a 10 wt. percent aqueous solution of the Dispersant. Each of the mixtures were subjected to ball milling using 25 ⅜" and 25 ¼" stainless steel balls (in each jar) for about 6 hours at a speed of approximately 100 rpm. The jars were then removed from the jar mill. Fifteen g of each dispersion was then placed into separate plastic cups for testing. The viscosity and foaming of each of the resulting products were noted.

Ten g of deionized water was added to each of the plastic cups containing the dispersion. The diluted dispersions were then briefly mixed by hand stirring. About 20 g of JON-CRYL® 77 acrylic resin emulsion was then slowly added to the plastic cup. After thoroughly mixing, the resulting inks were pulled down on Leneta cards with a No. 4 or No. 8 wire wound rod. The ink formulation was then dried in an oven for about 30 seconds at 200° F. Density measurements were recorded on a Macbeth densitometer. Gloss readings were measured, 60° on a Hunter Lab gloss meter. The results are set forth in Table I.

TABLE I

| Ex. No. | Dispersant | Rod | Gloss (Black Background) | Gloss (White Background) | Density | % Dispersant (Solid) |
| --- | --- | --- | --- | --- | --- | --- |
| | Blank | 4 | 49.9 | 25.5 | 0.94 | 0 |
| | Blank | 8 | 54.6 | 25.9 | 0.97 | 0 |
| 1 | 1 | 4 | 53 | 33 | 0.95 | 1 |
| 2 | 1 | 8 | 60 | 29.4 | 0.99 | 1 |
| 3 | 3 | 4 | 53 | 33 | 0.95 | 1 |
| 4 | 3 | 8 | 55.5 | 29.4 | 0.99 | 1 |
| | Blank | 4 | 54.5 | 28 | 0.95 | 0 |
| | Blank | 8 | 50.0 | 25 | 0.99 | 0 |
| 5 | 2 | 4 | 56 | 38 | 0.95 | 1 |
| 6 | 2 | 8 | 56.5 | 35.7 | 0.99 | 1 |
| | Blank | 4 | 54 | 23 | 0.93 | 0 |
| | Blank | 8 | 58 | 26 | 0.96 | 0 |
| 9 | 4 | 4 | 52 | 31 | 0.93 | 1 |
| 10 | 4 | 8 | 56 | 32 | 0.96 | 1 |
| 11 | 5 | 4 | 56 | 31 | 0.94 | 1 |
| 12 | 5 | 8 | 59 | 34 | 0.97 | 1 |

From the Table, it is apparent that the method of the instant invention renders improvements in gloss, pigment dispersion and color development. Since the drawdowns in the Examples (and Blanks) were performed on the inks after they were three months old, it can be concluded that the Examples remain fluid over a three-month period. In contrast, the blanks show a significant increase in viscosity.

EXAMPLES 13–18

The procedure set forth for Examples 1–12 was repeated with the dispersant indicated except that the resulting inks were pulled down on Lenata cards with a no. 6 wire wound rod. Density measurements were recorded on a Macbeth densitometer and gloss (black) readings were measured at 60° on a Hunter Lab gloss meter. The results are set forth in Table II.

TABLE II

| Ex. No. | Dispersant | Gloss | Density |
| --- | --- | --- | --- |
| | Blank | 87 | 1.22 |
| 13 | 6 | 97 | 1.4 |
| 14 | 7 | 94 | 1.38 |
| 15 | 8 | 93.5 | 1.29 |
| 16 | 9 | 91.5 | 1.21 |
| 17 | 10 | 95 | 1.27 |
| 18 | 1 | 97 | 1.4 |

EXAMPLES 19–26

The procedure set forth in Examples 13–18 was repeated. The dispersants were Dispersants 1 and 2. The variable changed in each of the Examples was the identification of the pigment. Pigments were obtained from Drew Graphics as follows:

Liquaflex® Black (carbon black);
Liquaflex® Blue (phthalo blue, GS);
Liquaflex® Yellow (diarylide yellow OT);
Liquaflex® Red (lithol rubine, HS).

The resulting dispersions were measured for gloss and density. The results are summarized in Table III below.

TABLE III

| Ex. No. | Dispersant | Pigment | Gloss | Density |
| --- | --- | --- | --- | --- |
| Blank | Blank | Blue | 80.2 | 1.12 |
| Blank | Blank | Red | 107.1 | 1.26 |
| Blank | Blank | Yellow | 96.1 | 1.69 |
| Blank | Blank | Black | 34.2 | 1.85 |
| 19 | Dispersant 2 | Blue | 81.1 | 1.12 |
| 20 | Dispersant 2 | Red | 106.8 | 1.28 |
| 21 | Dispersant 2 | Yellow | 105.1 | 1.77 |
| 22 | Dispersant 2 | Black | 42.3 | 1.7 |
| 23 | Dispersant 1 | Blue | 96.2 | 1.35 |
| 24 | Dispersant 1 | Red | 110.4 | 1.28 |
| 25 | Dispersant 1 | Yellow | 114.5 | 1.8 |
| 26 | Dispersant 1 | Black | 82.6 | 2.34 |

From the foregoing, it will be observed that numerous variations and modifications may be effected without departing from the true spirit and scope of the novel concepts of the invention.

What is claimed is:

1. A method of dispersing a pigment in an aqueous medium which comprises agitating an aqueous mixture of
   (a) water;
   (b) a polyoxyalkylated ether having the Units A and B wherein Unit A is an alkyl group of the formula:

and R and $R_1$ independently are hydrogen or a $C_1$–$C_{10}$ alkyl group; and x represents a number of from about 9 to about 75; and Unit B is of the formula:

wherein $R_2$ is hydrogen or a $C_1$–$C_5$ alkyl group; y is between from about 1 to about 475; $R_3$ is hydrogen or a $C_1$–$C_5$ alkyl group provided that when $R_3$ is hydrogen, the weight ratio of B/A+B is between about 75 to about 95; and
   (c) grinding resin: and
   (d) a pigment
until the pigment is uniformly distributed in the aqueous medium.

2. The method of claim 1 wherein the aqueous medium is prepared by dry blending the polyoxyalkylated ether, pigment and grinding resin and then combining the resulting dry-blended admixture with water.

3. The method of claim 1 wherein the polyoxyalkylated ether, prior to being admixed with the pigment and grinding resin, is dispersed in water.

4. The method of claim 3 wherein the weight percent of polyoxyalkylated ether in water, prior to being admixed with component (c) and (d), is between 5 to about 50.

5. The method of claim 1 wherein component (c) and (d), prior to being combined with the polyoxyalkylated ether, are diluted with water.

6. The method of claim 1 wherein the pigment is selected from the group consisting of nitroso pigments, diazo pigments, diazo condensation pigments, basic dye pigments, alkali blue pigments, Peacock blue lake pigments, phloxine pigments, quinacridone pigments, lake pigments of Acid Yellow 1 and 3, carbazole dioxazine violet pigments, alizarine take pigments, vat pigments, phthalocyanine pigments, diaryl pigments, β-naphthol pigments, carmine lake pigments, tetrachlorisoindolinone pigments, carbon black pigments, $TiO_2$ and iron oxide.

7. The method of claim 1 wherein the polyoxyalkylated ether is represented by the formula:

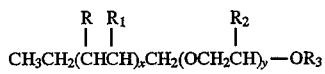

wherein $R_3$ is hydrogen.

8. The method of claim 7 wherein R and $R_1$ independently are —H or a $C_1$–$C_5$ alkyl.

9. The method of claim 1 wherein the polyoxyalkylated ether is of the formula

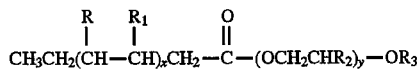

wherein $R_3$ is a $C_1$–$C_5$ alkyl group.

10. The method of claim 9 wherein x is less than about 55; and R and $R_1$ are independently hydrogen or a $C_1$–$C_5$ alkyl group.

11. The method of claim 10 wherein $R_3$ is —$CH_3$, $R_1$ and $R_2$ are independently hydrogen or a $C_1$–$C_3$ alkyl group and y is between from about 6 to about 275.

12. The method of claim 11 wherein R, $R_1$ and $R_2$ are independently —H or —$CH_3$ and y is between about 6 to about 180.

13. The method of claim 1 wherein the aqueous medium is prepared by
 (a) melting the polyoxyalkylated ether;
 (b) pouring the molten polyoxyalkylated ether into hot water wherein the amount of polyoxyalkylated ether in water is between from about 5 to about 25 weight percent;
 (c) cooling the water; and
 (d) adding the product of step (c) to the pigment and grinding resin.

14. A method of dispersing a pigment in an aqueous medium which comprises agitating an aqueous mixture of
 (a) water;
 (b) a reaction product of (i) a solid polymer derived from a polyolefin and an ethylenically unsaturated carboxylic acid or ester or anhydride thereof and (ii) an alkyl end-capped polyalkylene glycol of the formula $H(OCH_2CHR_2)_y$—O—$R_3$ wherein $R_2$ is hydrogen or a $C_1$–$C_5$ alkyl group, y is from about 8 to about 475 and $R_3$ is a $C_1$–$C_5$ alkyl group; and
 (c) grinding resin: and
 a pigment
until the pigment is uniformly distributed in the aqueous medium.

15. The method of claim 14 wherein $R_3$ is —$CH_3$.

16. The method of claim 14 wherein the polyoxyalkylated ether is a polymer of the formula:

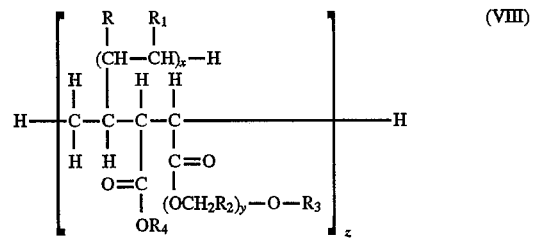

wherein $R_4$ is hydrogen or —$R_5$; $R_5$ is a $C_1$–$C_3$ alkyl group; x is between from about 3 to about 15; y is between from about 8 to about 475; and z is between from about 5 to about 20.

17. The method of claim 16 wherein $R_3$ is —$CH_3$.

18. The method of claim 14 wherein the ethylenically unsaturated carboxylic acid or ester or anhydride thereof is grafted onto the polyolefin.

19. The method of claim 18 wherein the ethylenically unsaturated carboxylic acid is maleic acid, ethylmaleic acid, propylmaleic acid, isopropyl maleic acid, fumaric acid, methylenemalonic acid, glutaconic acid, itaconic acid, methylitaconic acid, mesaconic acid or citraconic acid.

20. The method of claim 19 wherein the ethylenically unsaturated carboxylic acid or ester or anhydride thereof grafted onto the polyolefin is isopropyl maleate and further wherein $R_3$ is —$CH_3$.

21. The method of claim 14 wherein the aqueous medium is prepared by dry blending component (b), component (c) and component (d) and then combining the resulting dry-blended admixture with water.

22. A method of dispersing a pigment which comprises:
 (a) grinding a solid polyoxyalkylated ether having the Units A and B
wherein Unit A is an alkyl group of the formula:

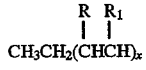

and R and $R_1$ individually are hydrogen or a $C_1$–$C_{10}$ alkyl group; and x represents a number of from about 9 to about 75; and
Unit B is of the formula:

—$(OCH_2CHR_2)_yOR_3$— wherein $R_2$ is hydrogen or a $C_1$–$C_{10}$ alkyl group; y is between from about 1 to about 475; $R_3$ is hydrogen or a $C_1$–$C_5$ alkyl group provided that when $R_3$ is hydrogen, the weight ratio of B/A+B is between about 75 to about 95;
 a grinding resin; and
 a solid pigment
in an aqueous medium; and
 (b) agitating the aqueous medium until the pigment is uniformly distributed.

23. The method of claim 22 wherein the polyoxyalkylated ether is represented by the formula:

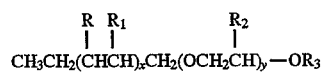

wherein $R_3$ is hydrogen and R, $R_1$ and $R_2$ are independently hydrogen or methyl.

24. The method of claim 22 wherein the polyoxyalkylated ether is of the formula

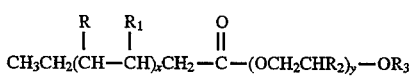

wherein x is less than about 55; R, $R_1$ and $R_2$ are independently hydrogen or —$CH_3$; and $R_3$ is —$CH_3$.

25. The method of claim 22 wherein the polyoxyalkylated ether is a reaction product of (i) a solid polymer derived from a polyolefin and an ethylenically unsaturated carboxylic acid or ester or anhydride thereof and (ii) an alkyl end-capped polyalkylene glycol of the formula

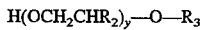

wherein y is from about 8 to about 475 and $R_3$ is —$CH_3$.

26. The method of claim 25 wherein the ethylenically unsaturated carboxylic acid is isopropyl maleate ester.

27. A method of dispersing a pigment in an aqueous medium which comprises:

(a) preparing an aqueous dispersion of a polyoxyalkylated ether having the Units A and B wherein Unit A is an alkyl group of the formula:

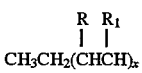

and R and $R_1$ individually are hydrogen or a $C_1$–$C_{10}$ alkyl group; and x represents a number of from about 9 to about 75; and Unit B is of the formula:

wherein $R_2$ is hydrogen or a $C_1$–$C_{10}$ alkyl group; y is between from about 1 to about 475; $R_3$ is hydrogen or a $C_1$–$C_5$ alkyl group provided that when $R_3$ is hydrogen, the weight ratio of B/A+B is between about 75 to about 95; and (b) combining the product of step (a) with either (i) a solid pigment and grinding resin or (ii) a pigment concentrate; and (c) dispersing the pigment in the resultant product of step (b) by agitation.

28. The method of claim 27 wherein the polyoxyalkylated ether is selected from the group consisting of the formulae:

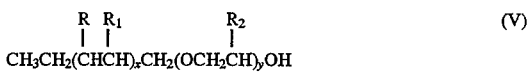

wherein R, $R_1$ and $R_2$ are independently selected from the group consisting of —H and —$CH_3$;

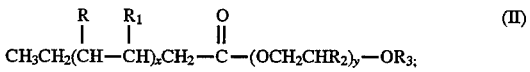

wherein R, $R_1$ and $R_2$ are independently selected from the group consisting of —H and —$CH_3$ and $R_3$ is a $C_1$–$C_5$ alkyl group; and the reaction product of (i) a copolymer derived from a polyolefin and an ethylenically unsaturated carboxylic acid, ester or anhydride thereof and (ii) an alkyl end-capped polyalkylene glycol of the formula

$R_3$ being a $C_1$–$C_5$ alkyl group.

29. The method of claim 27 wherein the components of (i) and (ii) are diluted in water prior to the addition of the product of step (a).

* * * * *